Sept. 3, 1963 M. A. REX ETAL 3,102,383
TEMPERATURE COMPENSATED CATAPULT
Filed June 5, 1961
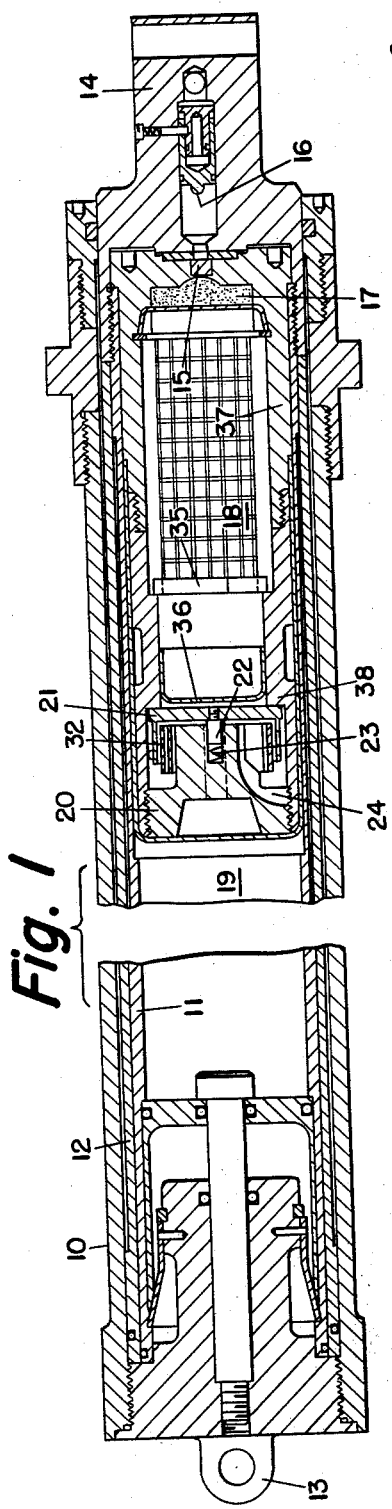
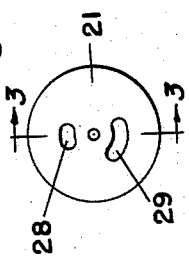
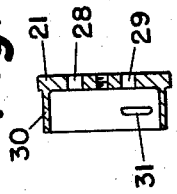
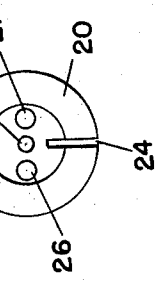
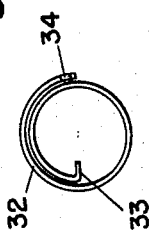
INVENTORS
MARTIN A. REX
GERALD R. REAGLE
BY
ATTORNEYS.

United States Patent Office 3,102,383
Patented Sept. 3, 1963

3,102,383
TEMPERATURE COMPENSATED CATAPULT
Martin A. Rex, Chicago, and Gerald R. Reagle, Wilmette, Ill., assignors, by mesne assignments, to the United States of America as represented by the Secretary of the Army
Filed June 5, 1961, Ser. No. 115,052
6 Claims. (Cl. 60—26.1)

This invention relates to an aircraft personnel ejection seat catapult and has for an object to enable the acceleration and rate of change thereof during ejection of the seat-mass to be more nearly uniform regardless of temperature.

It is known that the rate of acceleration of an occupant during ejection from an aircraft should be not over a prescribed amount. In the polar regions and at high altitudes the burning rate of propellant is slower than in the tropics. This means that with the conditions adjusted for ejection at 70° F., and at —40° F. i.e. that far below zero the combustion may be slowed to an extent retarding acceleration so that a seat occupant may not be cleared above a tail fin or other part of the plane. Conversely in the tropics the acceleration may be too high and likely to cause a seat occupant to black out. The use of high and low pressure chambers in a catapult has helped but not cured this difficulty.

According to the present invention this difficulty has been more nearly eliminated than at any previous time and an acceleration-temperature characteristic has more nearly approached a straight line. More specifically a pair of perforate wall portions are provided between the high pressure propellant combustion chamber and a lower pressure chamber for catapult utilization, with one of these perforate walls automatically adjustable in response to the ambient temperature to control the effective size of the orifice between the high and low pressure chambers. In other words the acceleration is substantially constant irrespective of temperature before ignition.

Referring to the drawing:

FIG. 1 is a longitudinal section through a preferred embodiment of this invention, FIG. 2 is a right side view of the fixed wall portion between the high and low pressure chambers, FIG. 3 is a longitudinal section through the movable wall portion between said high and low pressure chambers, FIG. 4 is a right side view of the movable wall portion of FIG. 3 between said high and low pressure wall portions, and FIG. 5 is an end view of the thermostat element for adjusting the position of the movable wall with respect to the fixed wall.

In FIG. 1 the outer casing 10 is secured to a base portion. An innermost tube 11 of the telescopically extensible tubes 11 and 12, has the tube 12 arranged as the intermediate tube. A lower connection 13 is attached preferably to some convenient portion of the aircraft frame against which the thruster must press in elevating the seat being ejected. An upper connection 14 is secured to a seat-mass being ejected. A primer 15 is actuated by a firing pin 16 which in turn sets off a booster charge of black powder 17 for firing the solid propellant in a cartridge in chamber 18. The space containing propellant is designated as the high pressure chamber while a major portion of the inner tube is occupied by the low pressure chamber 19 into which propellant gas expands after passing through perforate portions of fixed and angularly movable walls 20 and 21 respectively shown in FIG. 1 and more in detail in FIGS. 2, 3, and 4. The parts numbered 10 to 19 inclusive are all prior art to the present invention.

FIG. 2 is a right side view of the fixed wall portion 20 with the spiral thermostat element removed. This wall portion 20 is provided with a slot 24 in which an inner end of the spiral thermostat 32 is received and secured by any appropriate means. Perforations 26 and 27 when uncovered by the angularly movable wall portion, lead through this fixed wall to the low pressure chamber 19. A central recess 25 supports the movable wall 21 by means of a stem or hub 22 received in it. A spring 23 (FIG. 1) cooperates with the fixed and movable wall portions to separate them slightly for freedom of movement of the wall portion 21 in the absence of high pressure from propellant or before the solid propellant 18 has been fired.

The angularly movable wall portion 21 is shown more in detail in FIGS. 3 and 4 as being provided with perforations 28 and 29. This latter perforation is shown as being angularly longer than perforation 28 in order that a wider movement is permissible from a position in which the movable wall 21 uncovers both perforations 26 and 27 in the fixed wall 20, as is needed for the extreme low temperature. At the other extreme is the position needed for the hottest climate when all or most of one perforation in both walls may be closed by an imperforate portion of the other wall. Both perforations in both walls are never closed for that would render the catapult inoperative for its intended purpose and the propellant cartridge would explode. The perforation 29 is elongated to better insure one perforation in the fixed wall being always open. The flange 30 has the opposite end of the thermostat element 32 clamped to it by a headed bolt passing through slot 31 in this flange and through a hole 34 (FIG. 5) in this element. The opposite end of element 32 is bent at 33 to be held in slot 24 in the fixed wall. These walls 20 and 21 are each of steel. The thermostat is of bimetallic material capable of giving satisfactory angular displacement between its ends with a given temperature change. Specifically the thermostat 32 is #6650 and known as bimetal drawing No. 5–3586 (modified) of the W. M. Chace Co. of 1600 Beard Ave., Detroit 9, Michigan, with the low expansion side radially outside of the higher expansion side.

It has been found that not all the bimetallic elements 32 are alike, but that small differences in thickness and other dimensions exist causing them to be unlike in action. This is why the slot 31 has been provided in flange 30 of the movable wall 21. With the wall openings of the size needed to be effective at 70° F. the clamping bolt for the end of element 32 can then be located at the correct position in this slot 31 to give this the prescribed effective wall opening which may be illustrated and precisely dimensioned. No further calibration has been found necessary except perhaps at the higher temperatures where the substantially flat temperature-acceleration characteristic may tend to rise and the clamping bolt need further adjustment in slot 31 for higher temperatures. The solid propellant is usually cylindrical in shape when it has been found desirable to space it radially from the inner surface of the high pressure chamber in any convenient manner to obtain better uniformity in burning rate. For this purpose at least 3 steel wires or rods extend longitudinally and equally spaced angularly from a support 35 at one or both ends of the high pressure chamber. A thin metal foil-like cup 36 prevents any portions of the propellant which may have broken off in transit from passing through walls 20 and 21, yet on generation of high internal pressure this cup ruptures and blows into the perforations of wall 21. After ignition, pressure in chamber 18 presses wall 21 against fixed wall 20 compressing spring 23.

After ignition in the catapult shown functions in the customary manner, i.e. by forcing both tubes 11 and 12 together upward. Intermediate tube 12 is stopped by a shoulder portion near its base engaging an abutment near its top. After that the inner tube 11 continues to raise the seat-mass and may fly outward with the seat or not. The head 37 of the propellant cartridge is preferably of aluminum alloyed for strength and body portion 38 of this same cartridge is of either aluminum alloy or steel. No claim herein is broadly directed to a thermostat for controlling the size of an opening but principally to its use in a catapult and rocket that the need for providing temperature compensation has been needed.

We claim:

1. In an aircraft personnel ejection seat catapult having a mass-seat connection at one end and a means for attaching the same to an aircraft frame member, an outer tube, telescopically expansible inner tubes, a solid propellant adjacent one end of the innermost tube, means for igniting said propellant, a wall between said propellant and a low pressure chamber adjacent the end portion of said innermost tube opposite said igniting means, said wall having therein a perforate portion through which products of combustion must pass in reaching said low pressure chamber from a higher pressure chamber in which said propellant is carried, the combination therewith of the improvement whereby the effective area of said wall perforate portion may be varied automatically to compensate for the temperature in which said catapult has been located prior to being fired whereby a temperature velocity characteristic for the ejected seat-mass may be more nearly uniform, said improvement including at least a portion of said wall being fixed with respect to said innermost tube and a portion of said wall being angularly adjustable about an axis of said innermost tube, each of said wall portions being perforate, one of them being angularly adjustable with respect to the other for controlling the effective size of the perforate portions of the wall between said high and low pressure chambers, and a spiral thermostat element one end of which is connected to the fixed perforate wall portion and the other end of which is connected to the movable and perforate wall portion whereby the effective size of the perforate wall portions is enlarged with a drop in temperature and made smaller with a temperature increase.

2. A catapult according to claim 1 in which said fixed and movable perforate wall portions are clamped in position by propellant pressure after firing the movable wall portion being on the propellant side of the fixed wall portion.

3. A catapult according to claim 2 in which a spring cooperates with said fixed and movable plates for keeping them separated prior to firing the propellant.

4. A catapult according to claim 3 in which said spiral thermostat element is bimetallic and connected to increase the effective perforate area of the wall portions with a drop in ambient temperature.

5. A catapult according to claim 4 in which said movable wall portion and fixed wall portion each has two perforate portions, those in the fixed wall portion being substantially circular and at least one of those in the movable wall portion being of angular extent approximately twice that of the other perforate portion, the center of each perforation being about the same distance from the center of rotation of the movable wall portion.

6. A catapult according to claim 5 in which said movable wall portion is provided with a flange extending axially and radially outside said fixed wall portion and said bimetallic thermostat element, said flange being provided with a slot through which a member passes for clamping an end portion of said spiral thermostat element thereto, whereby the position of said end portion may be adjusted angularly to compensate for any non-uniformity in said thermostat element.

References Cited in the file of this patent

UNITED STATES PATENTS

| | | |
|---|---|---|
| 2,383,053 | Fanger | Aug. 21, 1945 |
| 2,481,059 | Africano | Sept. 6, 1949 |
| 2,612,747 | Skinner | Oct. 7, 1952 |
| 2,815,008 | Hirt | Dec. 3, 1957 |
| 2,909,032 | Davies | Oct. 20, 1959 |
| 2,937,830 | Fulton | May 24, 1960 |